Aug. 23, 1927.

B. J. ZOBEL 1,640,305

TIRE RIM

Original Filed April 20, 1925    3 Sheets-Sheet 1

B. J. Zobel —
INVENTOR

BY Victor J. Evans
ATTORNEY

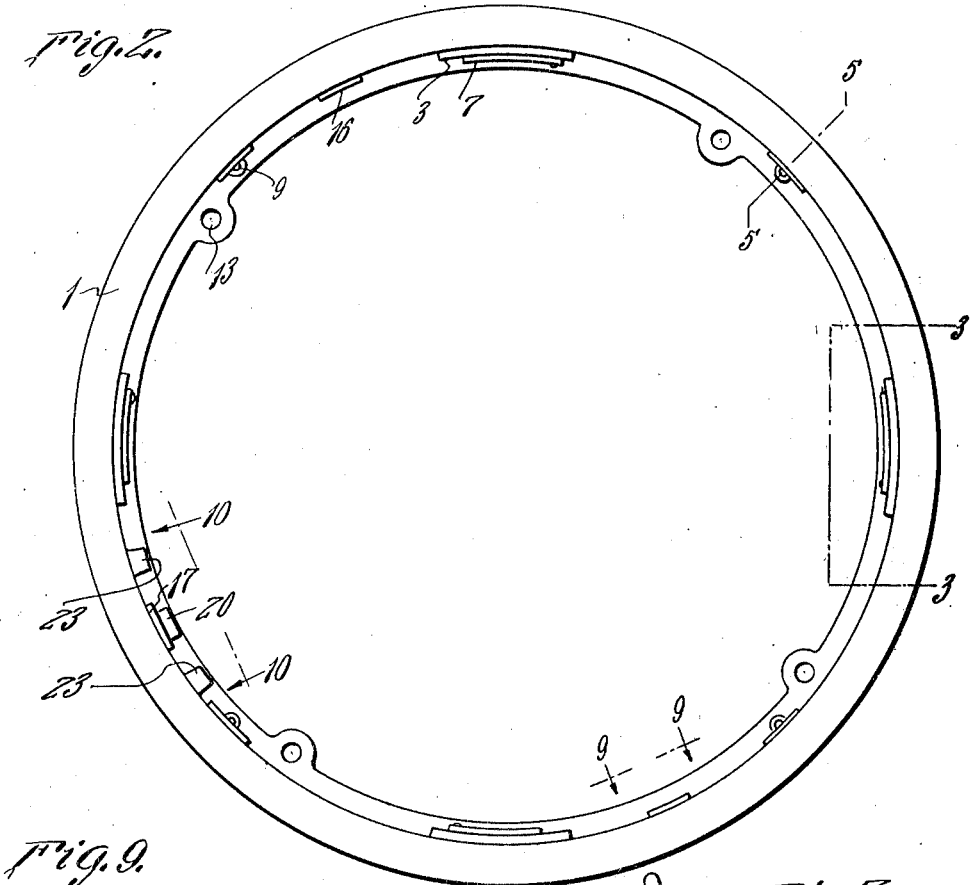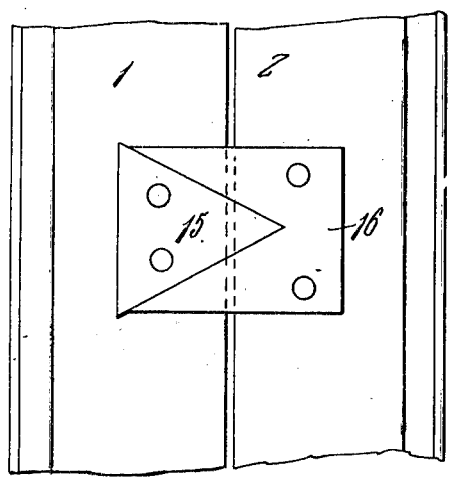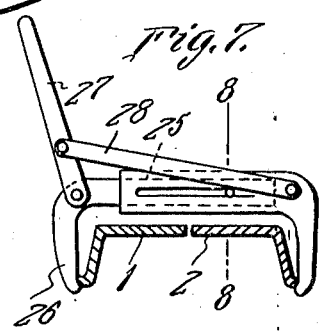

Aug. 23, 1927.
B. J. ZOBEL
1,640,305
TIRE RIM
Original Filed April 20, 1925   3 Sheets-Sheet 3
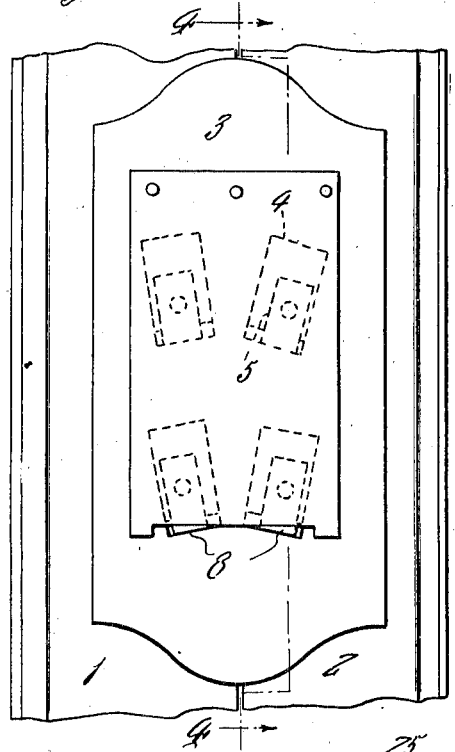
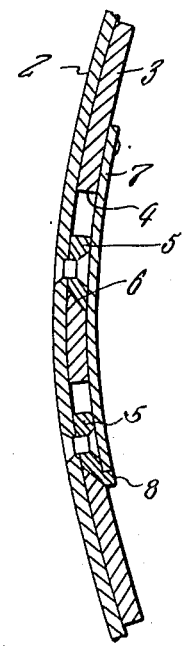
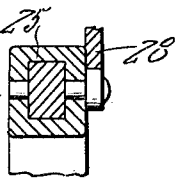
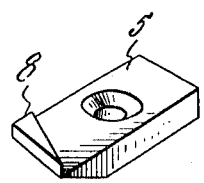
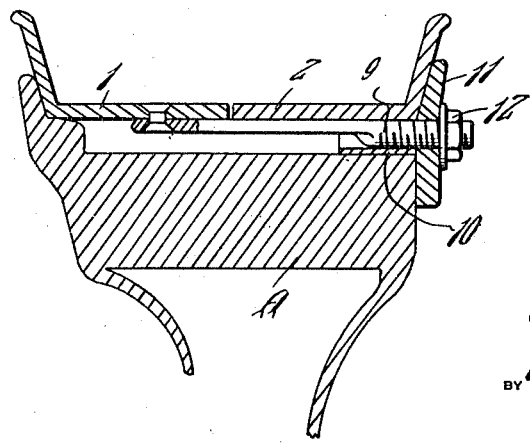
B. J. Zobel
INVENTOR
BY Victor J. Evans
ATTORNEY Patented Aug. 23, 1927.

1,640,305

UNITED STATES PATENT OFFICE.

BENJAMIN J. ZOBEL, OF BUFFALO, NEW YORK.

TIRE RIM.

Application filed April 20, 1925, Serial No. 24,541. Renewed June 3, 1927.

This invention relates to a tire rim, the general object of the invention being to make the rim in two sections with means for clamping the two sections together with the tire between them, thus enabling a tire to be placed on the rim or removed therefrom with but little effort and in a minimum amount of time.

A further object of the invention is to provide a plurality of plates having holes therein for engaging lugs on the sections for drawing the sections together when the plates are struck by a tool with spring means for locking the plates in locking position.

Another object of the invention is to provide means on the two sections for guiding them into proper position.

This invention also consists in certain other features of construction and in the combination and arrangement of the several parts, to be hereinafter fully described, illustrated in the accompanying drawings and pointed out in the appended claims.

In describing my invention in detail, reference will be had to the accompanying drawings wherein like characters denote like or corresponding parts throughout the several views, and in which:

Figure 2 is a view of the improved rim with the locking ring thereon.

Figure 3 is a section on line 3—3 of Figure 2.

Figure 4 is a section on line 4—4 of Figure 3.

Figure 5 is a section on line 5—5 of Figure 2.

Figure 6 is a view of one of the lugs.

Figure 7 is a view of the tool used in drawing the sections together.

Figure 8 is a section on line 8—8 of Figure 7.

Figure 9 is a view looking in the directions of the arrows 9 in Figure 2.

Figure 1:
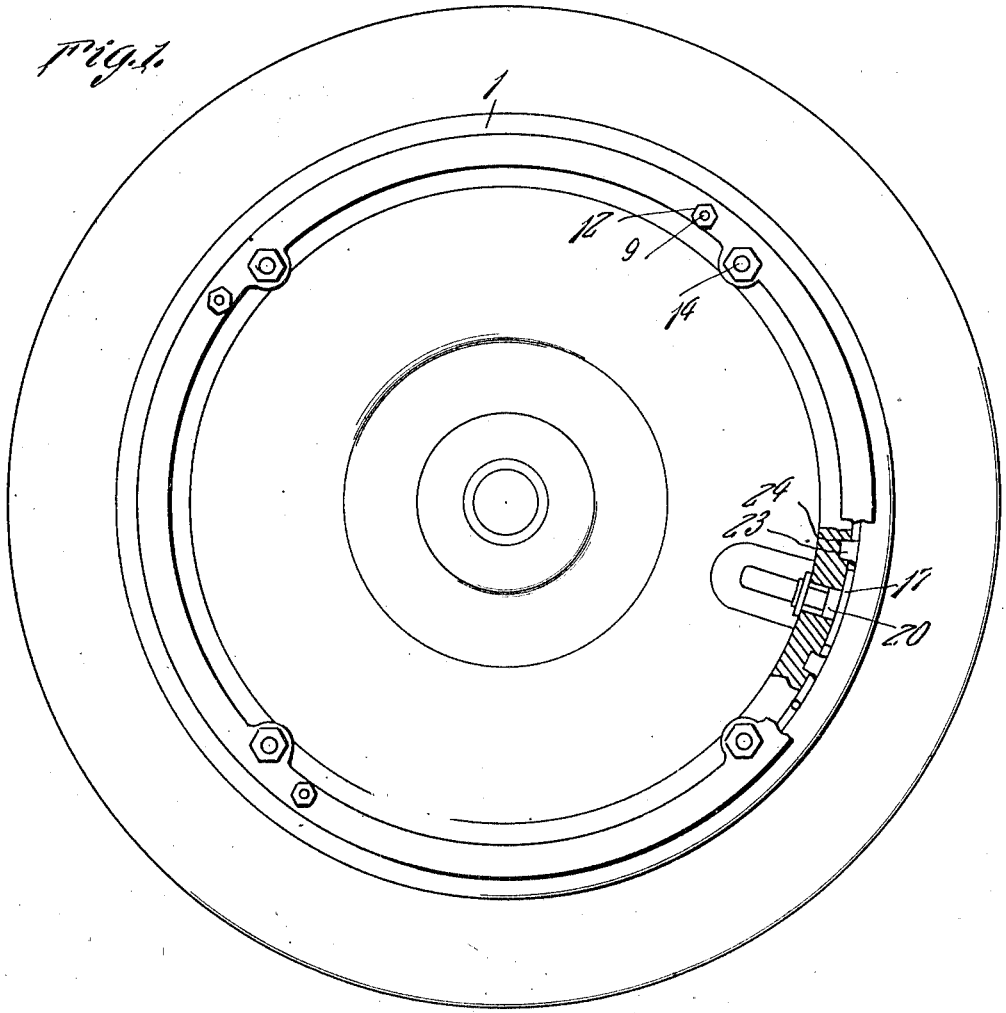
Figure 1 is a view of a wheel showing my invention in use.
Figure 10:
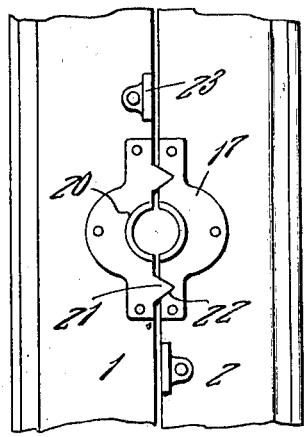
Figure 10 is a fragmentary view looking in the direction of the arrows 10 in Figure 2.

As shown in these views, the improved rim is composed of two sections 1 and 2 which have their inner edges abutting at the circumferential center of the wheel rim. The two sections are locked together by means of a plurality of plates 3 on their inner faces, each plate having two pairs of inclinedly arranged openings 4 therein for engaging inclinedly arranged lugs 5 on the sections, these parts being so arranged that when the openings in the plate are placed over the lugs and the plate struck with a hammer or other tool, the engagement of the lugs with the inclined walls of the openings will cause the two sections to move together until their inner edges abut and thus grip a tire between their upturned outer edges. The inner ends of the openings 4 are provided with beveled walls which are engaged by the beveled ends of the lugs, as shown at 6, so that the plate will be locked to the lugs when the plate is driven home. The plate is further locked in place by means of a flat spring 7 riveted at one end to the plate and having its free end adapted to engage the projections 8 formed on the outer set of lugs. This arrangement of parts will prevent the plate from being driven in an opposite direction from that which locks the plate until the spring is raised out of engagement with the projections 8.

The section 1 has pivoted thereto the flat portions of bolts 9 which pass through guides 10 on the inner face of section 2 and which are adapted to pass through a locking ring 11 and to receive nuts 12 for holding the locking ring against the upturned flange of section 2 and against the felly of the wheel A when the rim is on the wheel. This locking ring is provided with the openings 13 for receiving the bolts 14 which pass through the felly so that the locking ring will thus hold the tire rim on the wheel.

A number of V-shaped plates 15 are fastened to one section and are adapted to engage V-shaped recesses in plates 16 fastened to the other section for properly positioning the sections relative to each other and plates 17 are fastened to the sections, each plate having a semi-circular projection 20 thereon, which, when the sections are placed together, will form with the other projection a tubular part which passes through a hole in the felly and acts as a guide for the valve stem. These plates 17 are also provided with V-shaped guiding parts 21 and recesses 22. Projections 23 are also carried by the sections for engaging recesses 24 in the felly to prevent the rim from creeping on the wheel. The valve stem guide will also act to prevent this creeping movement.

I may provide a tool such as shown in Figures 7 and 8 for bringing the sections together with the tire between them, this tool comprising telescopic members 25, having the horns 26 for engaging the sections, the lever 27 pivoted to one member and a link 28 connecting the lever with the other member. Thus, by swinging the lever 27 the link 28 will cause the two members 25 to move toward each other, as shown in Figure 7, and this movement will contract the sections of the rim upon the tire and permit the sections to be fastened together by the locking plates, as before described.

It will be seen from the foregoing that I have provided a rim composed of two parts separated at the circumferential center of the rim so that the parts can be taken apart to place a tire in position, with means for locking the two sections together to hold the tire between them.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described the invention, what is claimed as new, is:—

1. A rim of the class described comprising two sections, lugs on the inner faces of the sections, the outer edges of the lugs being inclined with respect to the edges of the sections, locking plates having inclinedly arranged openings for receiving the lugs, said plates when moved forwardly acting upon the lugs to draw the sections together, the front end walls of the openings and the front ends of the lugs being beveled and means for locking the plates against endwise movement.

2. A rim of the class described comprising two sections, inclinedly arranged lugs on the inner faces of the sections, locking plates having inclinedly arranged openings for receiving the lugs, said plates when moved forwardly acting upon the lugs to draw the sections together and means for locking the plates against movement, such locking means consisting of a spring on each plate and projections on some of the lugs for engaging the ends of the spring.

3. A rim of the class described comprising two sections having their inner edges abutting at the circumferential center of the wheel, means for drawing the two sections together and locking them in this position, bolts connected with the inner face of one section, guiding means for the bolts on the other section, a locking ring through which the bolts pass, and nuts on the bolts for holding the locking ring in position.

4. A rim of the class described comprising two sections having their inner edges abutting at the circumferential center of the wheel, means for drawing the two sections together and locking them in this position, bolts connected with the inner face of one section, guiding means for the bolts on the other section, a locking ring through which the bolts pass, nuts on the bolts for holding the locking ring in position, and means for guiding the sections in the movement toward each other.

In testimony whereof I affix my signature.

BENJAMIN J. ZOBEL.